US010026513B2

(12) United States Patent
Cardon et al.

(10) Patent No.: US 10,026,513 B2
(45) Date of Patent: Jul. 17, 2018

(54) RADIATION SHIELDING AND PROCESSES FOR PRODUCING AND USING THE SAME

(71) Applicant: Turner Innovations, LLC, Orem, UT (US)

(72) Inventors: Joseph M. Cardon, Provo, UT (US); Thomas L. Youd, Salt Lake City, UT (US); D. Clark Turner, Payson, UT (US)

(73) Assignee: Turner Innovations, LLC., Orem, UT (US)

( * ) Notice: Subject to any disclaimer, the term of this patent is extended or adjusted under 35 U.S.C. 154(b) by 79 days.

(21) Appl. No.: 14/468,011

(22) Filed: Aug. 25, 2014

(65) Prior Publication Data

US 2015/0348660 A1 Dec. 3, 2015

Related U.S. Application Data

(60) Provisional application No. 62/006,579, filed on Jun. 2, 2014.

(51) Int. Cl.
*G21F 1/10* (2006.01)
*C08F 230/04* (2006.01)

(52) U.S. Cl.
CPC ............ *G21F 1/106* (2013.01); *C08F 230/04* (2013.01); *G21F 1/10* (2013.01)

(58) Field of Classification Search
None
See application file for complete search history.

(56) References Cited

U.S. PATENT DOCUMENTS

| 3,001,967 | A | * | 9/1961 | Willersinn | ............... C08F 2/00 523/521 |
| 3,609,372 | A | | 9/1971 | Vogel | |
| 4,129,524 | A | | 12/1978 | Nagai et al. | |
| 4,182,821 | A | * | 1/1980 | Nagai | ...................... G21F 1/10 252/183.13 |
| 4,250,072 | A | | 2/1981 | Flynn | |
| 4,292,419 | A | | 9/1981 | Kamada et al. | |
| 4,429,094 | A | | 1/1984 | Massucco | |

(Continued)

FOREIGN PATENT DOCUMENTS

| CN | 101570606 B | 1/2011 |
| DE | 2732006 A1 | 7/1977 |

(Continued)

*Primary Examiner* — Joseph D Anthony
(74) *Attorney, Agent, or Firm* — Kenneth E. Horton; Kirton McConkie

(57) ABSTRACT

Lead-free radiation shielding material and processes for producing and using the same are described. The radiation shielding comprising a heavy metal component, such as bismuth, and a polymer component while also being optically transparent. The bismuth can be bonded to the polymer component or can be embedded within the matrix of the polymer component without being bonded to the polymer. As well, the bismuth can be nanoparticles that are contained within the matrix of the polymer component without being bonded to the polymer. The bismuth provides a stable, environmentally benign alternative to lead, while blocking the radiation and also being optically transparent. Other embodiments are described.

18 Claims, 4 Drawing Sheets

(56) References Cited

U.S. PATENT DOCUMENTS

| | | | |
|---|---|---|---|
| 4,485,197 A * | 11/1984 | Yokoi | C08F 230/04 523/177 |
| 4,584,326 A | 4/1986 | Flynn | |
| 4,585,841 A * | 4/1986 | Eguchi | G02B 1/04 526/240 |
| 4,587,277 A | 5/1986 | Sato | |
| 5,015,863 A | 5/1991 | Takeshima et al. | |
| 5,024,232 A | 6/1991 | Smid et al. | |
| 5,059,807 A | 10/1991 | Kersten et al. | |
| 5,140,710 A | 8/1992 | Rademacher | |
| 5,190,990 A | 3/1993 | Eichmiller | |
| 5,256,334 A | 10/1993 | Smid et al. | |
| 5,334,847 A | 8/1994 | Kronberg | |
| 5,548,125 A | 8/1996 | Sandbank | |
| 5,550,383 A | 8/1996 | Haskell | |
| 5,604,784 A | 2/1997 | Widlicka et al. | |
| 5,856,415 A | 1/1999 | Lagace et al. | |
| 5,891,935 A * | 4/1999 | Schneider | C08F 230/04 106/14.13 |
| 5,908,884 A | 6/1999 | Kawamura et al. | |
| 6,166,390 A | 12/2000 | Quapp et al. | |
| 6,387,981 B1 * | 5/2002 | Zhang | A61K 6/0017 522/81 |
| 6,517,743 B2 | 2/2003 | Anayama et al. | |
| 6,517,774 B1 | 2/2003 | Bray et al. | |
| 6,740,260 B2 | 5/2004 | McCord | |
| 6,828,578 B2 | 12/2004 | DeMeo et al. | |
| 6,841,791 B2 | 1/2005 | DeMeo et al. | |
| 7,053,013 B1 | 5/2006 | Nosov et al. | |
| 7,063,459 B2 | 6/2006 | McGovern et al. | |
| 7,250,119 B2 | 7/2007 | Sayala | |
| 7,384,576 B1 | 6/2008 | Jungermann et al. | |
| 7,399,431 B2 | 7/2008 | Abadie et al. | |
| 7,476,889 B2 | 1/2009 | DeMeo et al. | |
| 7,491,356 B2 | 2/2009 | Heikkila | |
| 7,524,438 B2 | 4/2009 | Malalel et al. | |
| 7,632,880 B2 | 12/2009 | Li et al. | |
| 7,638,783 B2 | 12/2009 | McCord | |
| 7,740,682 B2 | 6/2010 | Ragan et al. | |
| 8,308,986 B1 | 11/2012 | Stuart | |
| 8,334,524 B2 | 12/2012 | DeMeo et al. | |
| 8,728,349 B2 | 5/2014 | Liu et al. | |
| 8,803,115 B2 | 8/2014 | Leucht et al. | |
| 2002/0148980 A1 * | 10/2002 | Cadwalader | G21F 1/103 250/515.1 |
| 2005/0129179 A1 | 6/2005 | McGovern et al. | |
| 2006/0230495 A1 | 10/2006 | Theiss et al. | |
| 2009/0114857 A1 | 5/2009 | DeMeo et al. | |
| 2010/0044599 A1 | 2/2010 | McCord | |
| 2012/0012793 A1 | 1/2012 | Liu et al. | |
| 2012/0082959 A1 * | 4/2012 | Blomker | A61K 6/0038 433/222.1 |
| 2012/0217423 A1 | 8/2012 | Larmigny et al. | |
| 2016/0033680 A1 * | 2/2016 | Hamada | C09D 5/32 252/587 |

FOREIGN PATENT DOCUMENTS

| | | |
|---|---|---|
| DE | 102005034384 A1 | 2/2007 |
| DE | 102009037565 A1 | 2/2011 |
| EP | 0371699 | 6/1990 |
| EP | 1600985 | 11/2005 |
| EP | 1595169 B1 | 5/2007 |
| WO | 9003036 A1 | 3/1990 |
| WO | 2011018459 A1 | 2/2011 |

* cited by examiner

RADIATION SHIELDING AND PROCESSES FOR PRODUCING AND USING THE SAME

CROSS REFERENCE TO RELATED APPLICATIONS

This application claims priority to U.S. Patent Application No. 62/006,579, filed on Jun. 2, 2014, the entire disclosure of which is hereby incorporated by reference.

FIELD

This application relates generally to radiation shielding, and, more particularly to non-lead based radiation shielding and processes for producing and using the same.

BACKGROUND

X-radiation (composed of x-rays) is a form of electromagnetic radiation. X-ray wavelengths are shorter than those of UV rays and typically longer than those of gamma rays. X-rays can traverse relatively thick objects without being absorbed or scattered. For this reason, x-rays are widely used to image the inside of visually opaque objects. The most often seen applications are in medical radiography and airport security scanners.

Although widely used in both medicine and industry, ionizing radiation is hazardous and can cause significant bodily harm. X-ray photons carry enough energy to ionize atoms and disrupt molecular bonds. Consequently, ionizing radiation is harmful to living tissue. The extent and nature of the harm caused by ionizing radiation depends on a number of factors, including the amount of exposure, the frequency of exposure, and the penetrating power of the radiation to which an individual is exposed. Exposure can result in microscopic damage to living tissue; resulting in skin burns and radiation sickness at high exposures, and statistically elevated risks of cancer, tumors, and genetic damage at low exposures. At the cellular level, high doses of ionizing radiation can result in severe dysfunction, and even death, of cells. At the organ level, if a sufficient number of cells are so affected, the function of the organ becomes impaired.

Radiation shielding, sometimes referred to as radiation protection or radiological protection, protects people and the environment from the detrimental effects of ionizing radiation, including both particle radiation and high energy electromagnetic radiation. Accordingly, radiation shielding is often used as a protection device.

SUMMARY

This application describes non-lead based radiation shielding and processes for producing and using the same. The radiation shielding comprising a heavy metal component, such as bismuth, and a polymer component while also being optically transparent. The bismuth can be bonded to the polymer component or can be embedded within the matrix of the polymer component without being bonded to the polymer. As well, the bismuth can be nanoparticles that are contained within the matrix of the polymer component without being bonded to the polymer. The bismuth provides a stable, environmentally benign alternative to lead, while blocking the radiation and also maintaining the polymer as optically transparent.

BRIEF DESCRIPTION OF THE DRAWINGS

The following description can be better understood in light of the Figures, in which.

Figure 1:
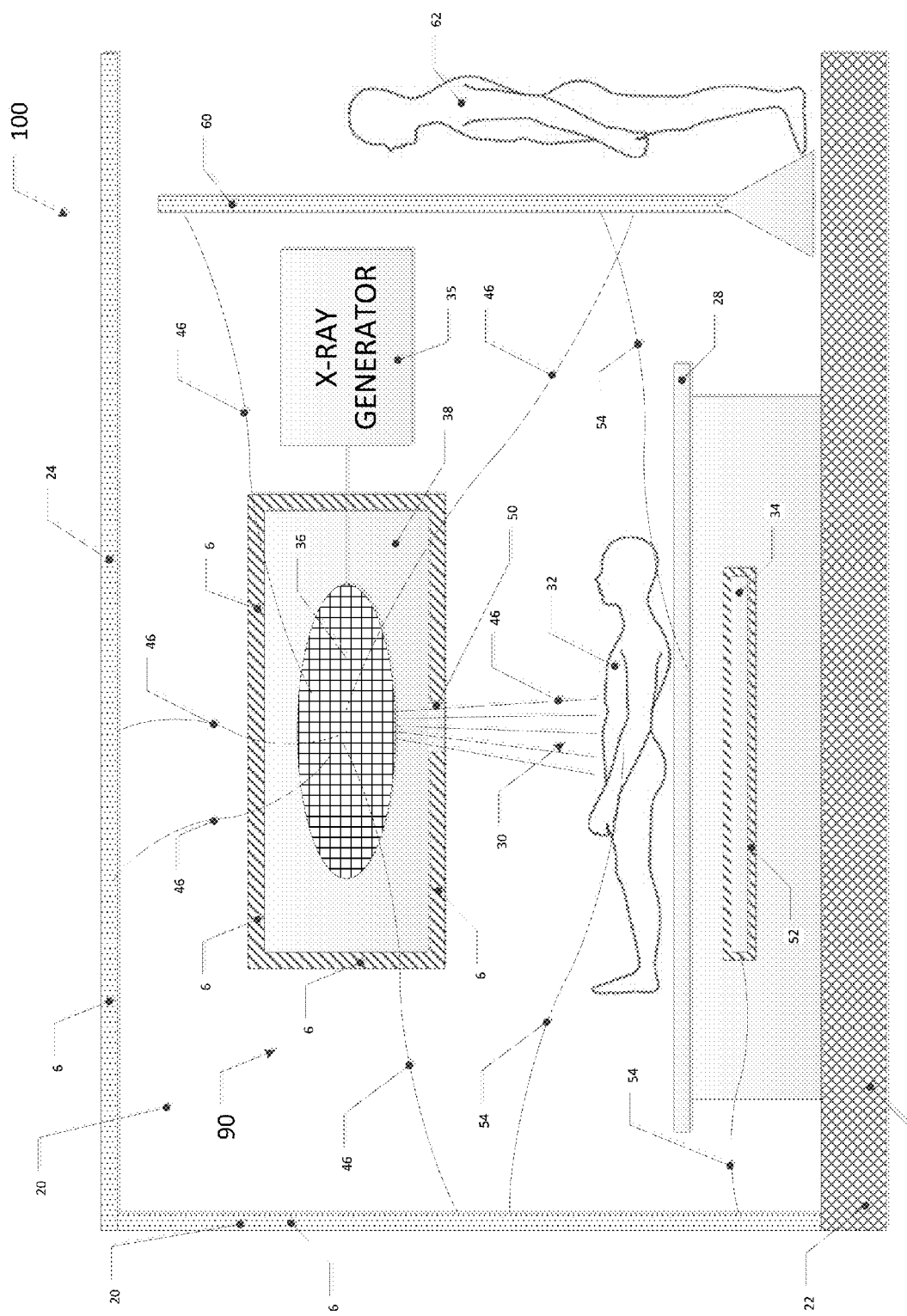
FIG. 1 illustrates some embodiments of an x-ray examination room with radiation shielding.

The Figures illustrate specific aspects of the radiation shielding and methods for making and using the radiation shielding. Together with the following description, the Figures demonstrate and explain the principles of the structures, methods, and principles described herein. In the drawings, the thickness and size of components may be exaggerated or otherwise modified for clarity. The same reference numerals in different drawings represent the same element, and thus their descriptions will not be repeated. Furthermore, well-known structures, materials, or operations are not shown or described in detail to avoid obscuring aspects of the described devices. Moreover, for clarity, the Figures may show simplified or partial views, and the dimensions of elements in the Figures may be exaggerated or otherwise not in proportion.

DETAILED DESCRIPTION

The following description supplies specific details in order to provide a thorough understanding. Nevertheless, the skilled artisan would understand that the described systems and methods can be implemented and used without employing these specific details. Indeed, the described systems and methods can be placed into practice by modifying the illustrated devices and methods and can be used in conjunction with any other apparatus and techniques conventionally used in the industry. For example, while the description below focuses on systems and methods using radiation shielding for x-rays, the described systems and methods (or portions thereof) can be used with any other ionizing radiation.

The present application describes a radiation shielding which contains a heavy metal that is not lead, methods for making such radiation shielding, and methods for using the radiation shielding as a protection device. The radiation shielding can be used to shield people and the environment from the detrimental effects of ionizing radiation, including both particle radiation and high energy electromagnetic radiation. The radiation shielding can influence the propagation of radiation in various ways, including by scattering, collimating, focusing, re-directing, blocking or attenuating.

One example of how the radiation shielding can be used is depicted in FIG. 1. FIG. 1 depicts an x-ray examination room 100 with a mobile radiation barrier containing an optically transparent window. The examination room 100 has a source of radiation 90 disposed therein. The examination room 100 is defined by walls 20, floor 22, and ceiling 24. A patient table 28 is positioned in the room relative to the radiation source such that a gap 30 is formed therebetween. A patient 32 (or other object) can be disposed on the top of the table and in the gap during examination (i.e., a medical examination). An x-ray detector 34 can be positioned in or on the table to receive radiation from the radiation source impinging thereon.

The radiation source 90 is comprised of a high voltage generator 35 connected to an x-ray tube 36 for supplying power during the production of radiation. The x-ray tube 36 is contained in an enclosure 38 that supports the x-ray tube in a position relative to the patient and the table. The x-ray tube produces x-rays 46 that propagate in a plurality of directions from the x-ray tube. To reduce the amount of x-rays propagating in undesirable directions, the inside walls of the x-ray tube enclosure 38 are coated with a sufficient thickness of radiation-shielding material 6 to reduce the amount of x-rays passing through the walls of the x-ray tube to a desirable level. To selectively allow x-rays to leave the enclosure, an x-ray transparent window 50 is placed in a wall of the enclosure adjacent the anode. In use, the window is oriented towards the gap such that x-rays passing through are directed into the gap.

During the production of radiation during an examination, x-rays pass through the window, through the gap, through the patient, through the table and strike the x-ray sensitive screen. The detector 34 detects the x-rays and converts the x-rays into visible light in a manner well known in the art.

Any radiation passing through the walls of the x-ray tube propagate into the room. Similarly, radiation from the x-ray tube that interacts with materials in its path, such as the patient, produces scattered radiation 54 that propagates in a plurality of directions within the room. To contain the scattered radiation and any radiation that passes through the walls of the x-ray tube, a coating of the radiation-shielding material 6 can be applied to one or more of the walls, floor and ceiling of the room as required to obtain a desirable level of radiation attenuation. In this manner, radiation produced during an examination is contained within the room to an acceptable level so as to minimize the potential for undesired radiation exposure outside the room.

The x-ray examination room can also contain an x-ray mobile barrier 60 with a radiation-shielding window that provides protection against radiation. The window provides protection against radiation while enabling the technician 62 to see clearly through it. Part or all of the barrier 60 and/or the radiation shield 6 can be made in some embodiments from the radiation shielding material described herein.

The radiation shielding material can be used in any method, device, or system where the radiation needs to be partially or completely shielded. In some configurations, the radiation shielding can partially or completely substitute lead-based radiation shielding and/or other non-lead based radiation shielding configurations.

The radiation shielding contains a polymer component and a heavy metal component that are combined to make the radiation shielding material. In some configurations, the radiation shielding can contain multiple polymer components and/or multiple heavy metal components.

The radiation shielding contains a polymer component that may be supplemented with thermosetting materials and/or thermoplastic materials. Examples of the polymer component(s) includes plastics, resins, epoxy, polyester, polyurethane, silicone rubber, bismaleimides, polyimides, vinylesters, urethane hybrids, polyurea elastomer, phenolics, cyanates, cellulose, fluoro-polymer, ethylene inter-polymer alloy elastomer, ethylene vinyl acetate, nylon, polyetherimide, polyester elastomer, polyester sulfone, polyphenyl amide, polypropylene, polyvinylidene flouride, acrylic, acetates, acrylonitrile-butadiene-styrene, fluoropolymers polyamides, polyamide-imides, polyacrylates, polyether ketones, polyaryl-sulfones, polybenzimidazoles, polycarbonates, polybutylene, terephthalates, polyether sulfones, polyphenylene sulfides, polyethylene, polypropylene, polysulfones, polyvinylchlorides, styrene acrylonitriles, polystyrenes, polyphenylene, ether blends, styrene maleic anhydrides, allyls, aminos, polyphenylene oxide, as well as homopolymers, copolymers, and ionomers thereof, and any combination thereof.

The radiation shielding also contains a heavy metal component. The effectiveness of the shielding mechanism for radiation (including gamma rays, and x-rays in particular) in some embodiments is dependent on the atomic number, or Z-value, and density of the shielding material. A denser shielding material with a higher Z-value is a better shielding material for high energy x-rays and gamma rays. Accordingly, in some embodiments, the radiation shielding contains a high-Z metal, such as bismuth (Bi), iodine (I), barium, tin, tantalum, cesium, antimony, gold, and tungsten.

In some configurations, the radiation shielding contains bismuth as the heavy metal element. Bismuth may be used in the radiation shielding instead of lead because bismuth is considered one of the less toxic of the heavy metals, provides comparable radiation shielding to lead, and can be configured to be optically transparent. As well, there exist a wide range of functional bismuth sources and methods for making them, e.g., carboxylic acid monomers, radical polymerization capable co-monomers, cross linking agents, radical initiators, and non-covalently-bonded soluble bismuth sources that provide increased flexibility in both design and manufacturing and allows for a greater range of function and use when compared with lead or lead-based materials.

The use of high-Z metals (especially bismuth) in the radiation shielding, as opposed to lead, offers numerous environmental, commercial, and application advantages. For example, while lead is subject to extremely strict regulations, bismuth compounds are generally subject to less stringent controls. Also, while the ingestion of lead results in adverse consequences, the ingestion of a majority of the bismuth containing compounds does not.

Bismuth can be used since it is relatively safe. This element is considered to have a low electrical and thermal conductivity, and is generally non-reactive and non-flammable. Furthermore, bismuth poses no hazardous or toxic waste disposal issues, requires no special handling procedures, thus lowering manufacturing costs especially when compared with lead compounds. Because the radiation shielding material contains no lead, significant savings in both cost and time may be realized, while avoiding the burdensome regulations related to lead. Lastly, because bismuth has a similar density to lead oxide, it can be used in place of lead in certain kinds/types of applications at a convenient 1:1 ratio.

Any amount of the heavy metal component can be used in the radiation shielding material provided that it exhibits the desired radiation shielding and the desired optical transparency. In some embodiments, the amount of the heavy metal component can range from about 10 to 40 wt %. In other embodiments, the amount of the heavy metal component can be about 30 wt %.

In addition to the polymer and heavy metal components, the radiation shielding can contain fillers, binders, fibers, and other components that can be added to the mixture of the polymer component and the heavy metal component to enhance the material properties of the radiation shield. As examples, electrically insulating materials, strengthening materials, materials to provide a uniform composition or bind other components, and/or density increasing materials may be used. A more specific list of examples includes such materials as barium sulfate, tungsten, other metals, calcium carbonate, hydrated alumina, tabular alumina, silica, glass beads, glass fibers, magnesium oxide, wollastonite, stainless steel fibers, copper, carbonyl iron, steel, iron, molybdenum, and/or nickel.

The radiation shielding can be manufactured using any process that can form the shielding with the desired radiation protective properties. When bismuth is used as the heavy metal component, the radiation shielding can be made using several methods. The first method comprises dissolving a bismuth monomer in a solvent monomer that copolymerizes in the final polymer. The second method comprises dissolving a bismuth source into a solvent monomer that remains dissolved in the final polymer. The third method comprises suspending nanoparticles of a bismuth containing compound in the polymer.

Figure 2:
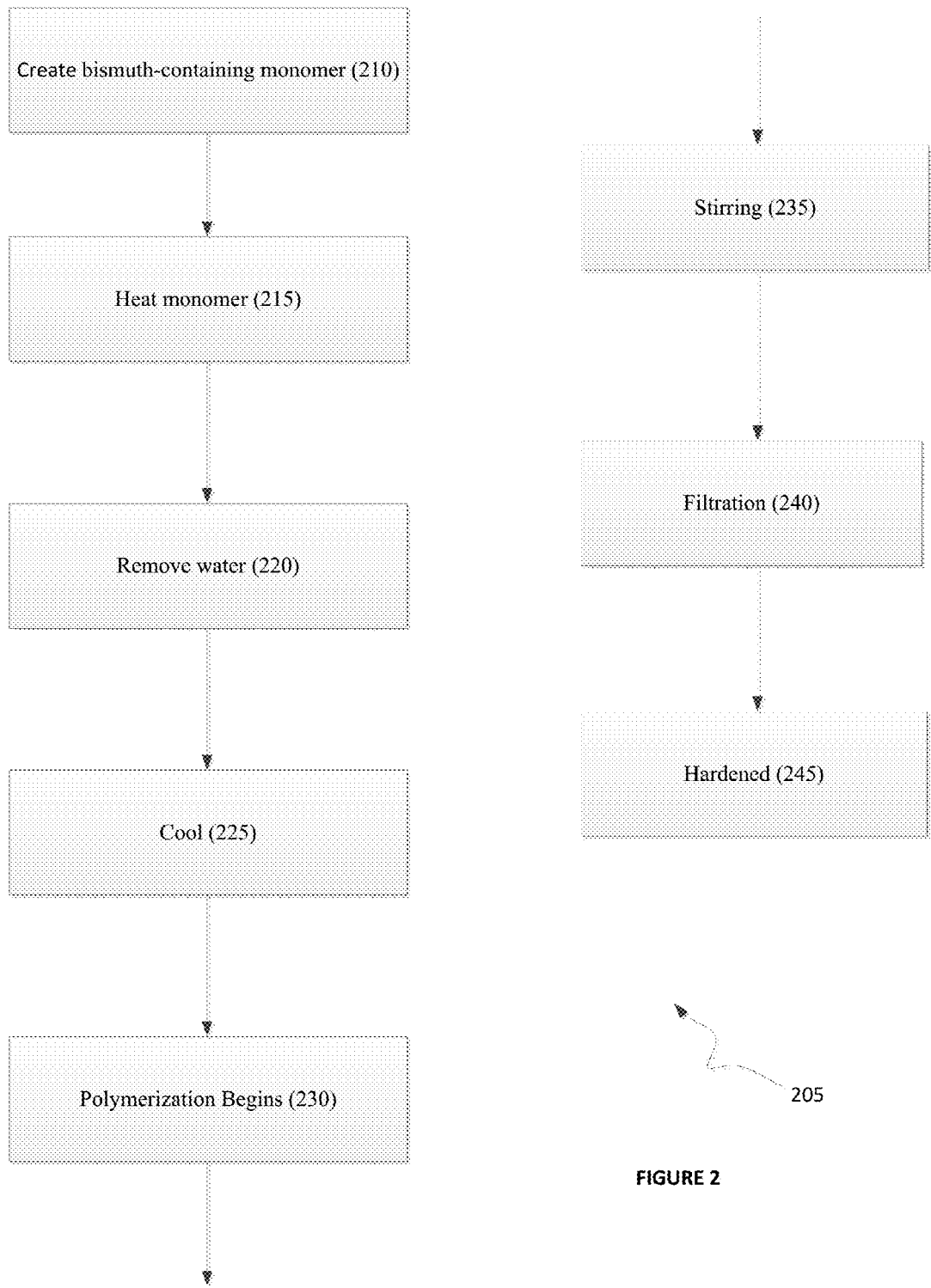
FIGS. 2-4 illustrates some embodiments of methods for making radiation shielding materials containing heavy metals.

FIG. 2 illustrates one exemplary process flow for the first method. The first method 205 begins as shown in box 210 by making a bismuth-containing monomer. The bismuth-containing monomer can comprise bismuth subsalicylate methacrylate, bismuth salicylate dimethacrylate, or subsalicylate methacrylate monomer. In some embodiments, the bismuth subsalicylate methacrylate monomer (MAA) can be created by combining bismuth subsalicylate (as a bismuth source) and methacrylic acid together under a vacuum. Commercially-available bismuth subsalicylate can be used in these embodiments since it is an environmentally friendly, safe source of bismuth that is non-toxic and highly stable and can be stored at room temperature under normal atmospheric conditions for a substantial amount of time. In other embodiments, other versions and derivatives of bismuth subsalicylate can be created by reacting bismuth oxide with a salicylic acid derivate. These derivates include but are not limited to salicylic acid, 3,5-diiodosalicylic acid, 4-bromosalicylic acid, 5-bromosalicylic acid, 4-chlorosalcylic acid, 4-methylsalicylic acid, 5-methylsalicylic acid, nitrosalicylic acid, bismuth subgallate and derivates and other combinations thereof.

Methacrylic acid (MAA) may be utilized in these embodiments since it can provide a carboxylic acid monomer. This acid monomer can undergo a condensation reaction with the bismuth source to create a bismuth subsalicylate carboxylate or bismuth subgallate carboxylate capable of direct incorporation into the polymer chain via radical polymerization. In other embodiments, an acid chloride monomer may be used instead of a carboxylic acid monomer in this condensation reaction with the bismuth source to create a compound capable of direct incorporation into the polymer chain via radical polymerization. Other carboxylic acid monomers are also possible, including but not limited to acrylic acid and its derivatives, maleic acid and its derivatives, and methacrylic acid and its derivatives.

The method 205 continues in box 215 when the resulting mixture is then heated and stirred under vacuum at a temperature ranging from about 25 to about 100 degrees Celsius. Next, as shown in box 220, any water resulting from this reaction can be removed using an ice trap and then measured. The resulting bismuth-containing monomer is then cooled, as shown in box 225, under a vacuum to approximately room temperature.

The method 205 continues when the processed bismuth-containing monomer begins the polymerization process. As part of the polymerization process, styrene, a cross-linking agent [such as poly(ethylene glycol)dimethacrylate], and an initiator [such as azobisisobutyronitrile (AIBN)] can be added to the bismuth-containing monomer, as shown in box 230. Styrene may be used in this polymerization because it is a co-monomer capable of radical polymerization with the bismuth-containing monomer. Other similar co-monomers that can be used include methyl methacrylate, 2-hydroxyethylmethacrylate, and methacrylic acid, as well as vinyl co-monomers such as acrylamide, N,N-dimethyl acrylamide, acrylonitrile, methacrylamide, methyl styrene, phenyl methacrylate, butyl, methacrylate, and other vinyl monomers.

Poly(ethylene glycol)dimethacrylate can be used in the polymerization because it is a cross-linking agent which is capable of the conduction of radical polymerization at more than one location. Other cross linking agents capable of radical polymerization at more than one location may also be used in other embodiments. These include, but are not limited to tetra(ethylene glycol)dimethacrylate, and divinyl benzene.

AIBN is used in this method in some embodiments to provide a radical initiator compatible with methacrylic acid to achieve polymerization. In other configurations, other radical initiators may be used, including but not limited to isonitriles, hydroperoxides, carbamates, peroxyacids, and peroxyesters.

Next, as shown in box 235, the mixture can then be stirred until it is homogenous and an opaque, white, viscous liquid is produced. The method 205 continues, as shown in box 240, when this liquid is then pressure filtered until a pale yellow, clear liquid is obtained. After filtration, the mixture is degassed once again before the polymerization process concludes. The resulting mixture is then poured into a mold and hardened, as shown in box 245. Optionally, the mixture is then annealed. The resulting optically-transparent bismuth-containing polymer contains bismuth that is chemically bound to the final polymer matrix. The bismuth-containing polymer contains about 30 wt % bismuth and has an x-ray attenuation such that about 1.2 cm of the bismuth-containing polymer is equivalent to 0.05 cm of lead.

This first method can be optionally modified. In some instances, a bismuth and/or tungsten source can also be added in the polymerization 230. Such a modification produces a syrup with higher bismuth concentration, or which contains both bismuth and tungsten which provides synergistic benefits of a more uniform x-ray absorption over the entire x-ray spectrum.

Figure 3:
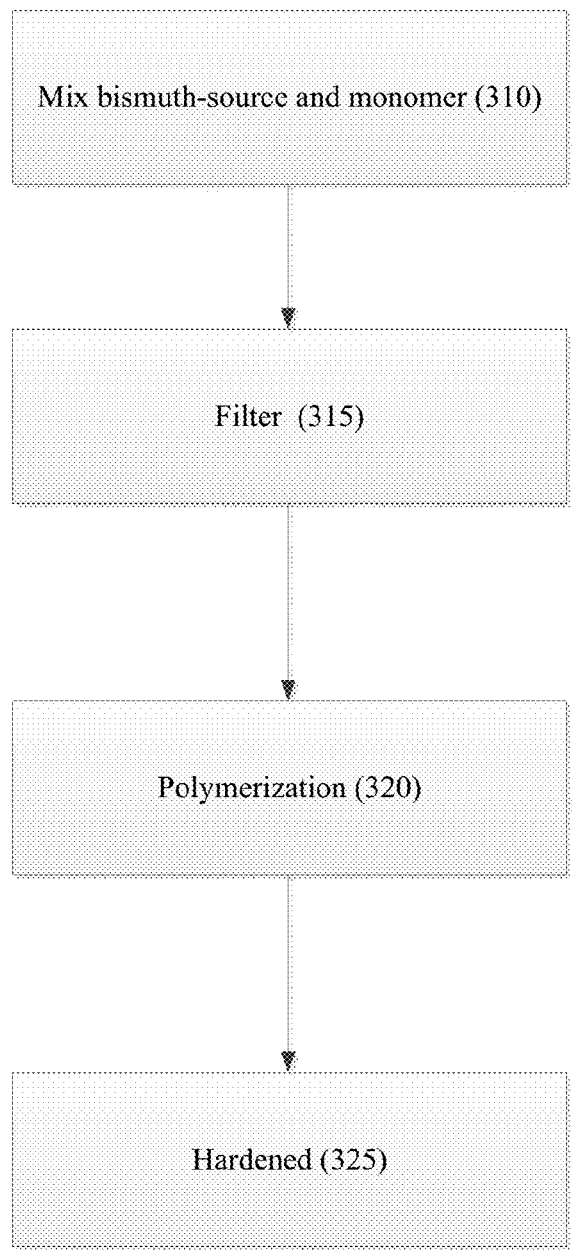
Figure 3:
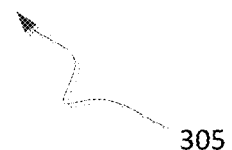

The second method for making the radiation shielding embeds the bismuth in the polymer material, but without the bismuth being chemically bound to the polymer. Some embodiments of this second method are illustrated in FIG. 3. In this method 305, a bismuth and/or tungsten source is added to a mixture of vinyl monomers, vinyl crosslinkers, and radical initiators and stirred so that it dissolves, as shown in box 310. In this method, the vinyl monomers can include acrylic acid, methacrylic acid, methyl methacrylate, ethyl methacrylate, butyl methacrylate, phenyl methacrylate, methyl acrylate butyl acrylate, phenyl acrylate, acrylonitrile, acrylamide, methacrylamide, N,N-dimethylacrylamide, styrene, methylstyrene, as well as homopolymers, copolymers, and ionomers thereof, and any combination thereof. The soluble bismuth source can include triphenyl bismuth or a bismuth-containing carboxylate where the carboxylate includes any molecule of the formula $RCO_2$—, where R is either a functionalized or non-functionalized hydrocarbon containing between 1 and 12 carbon atoms (such as phenyl bismuth carboxylate). The soluble tungsten sources can include silicotungstic acid, as well as lithium, sodium, potassium, rubidium, cesium, strontium, barium, tetramethylammonium, and tetrabutylammonium silicotungstate compounds, silane modified lacunary silicotungstic acid, salts of silane modified lacunary silicotungstate, phosphotungstic acid, salts of phosphotungstate, salts of silane modified lacunary phosphotungstate, or combinations thereof.

The method 305 continues, as shown in box 315, when the resulting mixture is filtered to remove cloudiness, resulting in a clear liquid. The clear liquid is then poured into a mold and polymerized, as shown in box 320. The mixture is then annealed and hardened, as shown in box 325. The resulting radiation shield contains about 13 wt % bismuth and/or tungsten and has an x-ray attenuation such that about 1.2 cm of the polymer is equivalent to 0.02 cm of lead.

Figure 4:
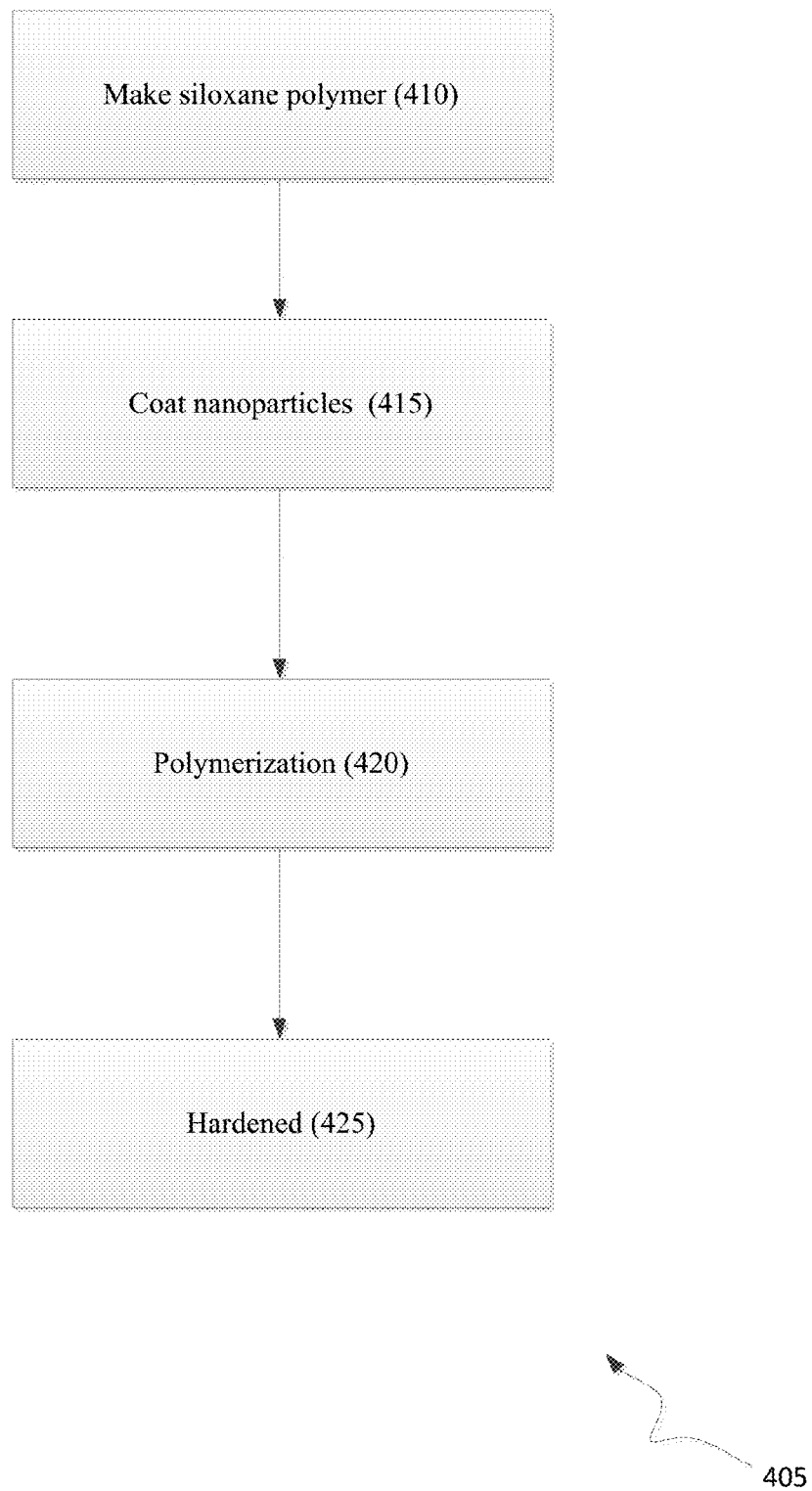

The third method of making the radiation shielding material comprises suspending nanoparticles of a bismuth-containing compound in the polymer. The bismuth nanoparticles are suspended in—but not chemically bound to—the polymer matrix. Some embodiments of this second method are illustrated in FIG. 4. In this method 405, a siloxane star graft polymer with vinyl functionalized ends can be prepared as shown in box 410. In some instances, this polymer can be prepared as using the processes described in U.S. Pat. Nos. 5,993,967 and/or 6,896,958.

The method 405 continues in box 415 when transparent heavy metal or heavy metal oxide nanoparticles (ZrO, $WO_3$) and/or transparently coated heavy metal or heavy metal oxide nanoparticles (ZnO coated BiO), the star graft polymer, a mixture of the vinyl monomers, and the radical initiator and mixed together and homogenized by high sheer mixing. This process coats the heavy metal or heavy metal oxide nanoparticles with the siloxane star graft polymer and suspends them in the vinyl monomer mixture.

Next, as shown in box 420, the resulting mixture is then poured into a mold and polymerized. The mixture is then annealed and hardened, as shown in box 425. The resulting radiation shield material contains transparent nanoparticles coated with siloxane star graft polymer that is suspended and copolymerized with the surrounding vinyl polymer matrix.

In these three methods, the bismuth sources can include bismuth methacrylate, monophenyl bismuth dimethacrylate, diphenyl bismuth monomethacrylate, bismuth dicarboxylate methacrylate, monophenyl bismuth monocarboxylate monomethacrylate, diphenyl bismuth monocarboxylate, bismuth subgallate, and bismuth 3,5-diiodosubsalicylate, wherein carboxylate includes any molecule of the formula $RCO_2$—, where R is either a functionalized or non-functionalized hydrocarbon containing between 1 and 12 carbon atoms. If R is functionalized with an iodine atom, such as in the case of iodobenzoic acid, or a derivative thereof, the resulting bismuth source also allows for the direct incorporation of iodine into the polymer matrix. As well, bismuth 3,5-diiodosubsalicylate may be used in place of bismuth subsalicylate in a substantially equal molar quantity to enable iodine to be incorporated into the polymer chain. And the tungsten sources can include silicotungstic acid, tetramethylammonium silicotungstate, cesium silicotungstate, and vinylsilane modified tetrabutylammium silicotungstate.

The radiation shielding made by these methods exhibit some of the properties of lead acrylic without containing lead. Historically, lead (Pb) has been the primary material used in radiation shielding. Lead is effective at attenuating gamma rays and x-rays because of its high density and high atomic number.

Even though lead is effective in shielding radiation, it has numerous drawbacks. If ingested, lead is poisonous. It damages the nervous system and causes brain disorders. Excessive lead also causes blood disorders in mammals. Like the element mercury, another heavy metal, lead is a neurotoxin that accumulates both in soft tissues and in bones. Because of its toxicity, lead is subject to increasingly strict regulatory controls. And lead has limited structural integrity.

But the radiation shielding made by these methods above contains a heavy metal element that serves a similar purpose as lead, but without some of the drawbacks. The heavy metal elements that are able to shield the radiation are elements that contain high densities and have high atomic numbers, or high-Z numbers. When radiation attempts to pass through these high-density, high-Z elements, their electrons absorb and scatter the energy of the x-ray.

The radiation shielding made by these methods is also optically transparent. Some conventional radiation shielding is not optically transparent. As such, the radiation shielding described herein can be used in applications where the conventional radiation shielding cannot, i.e., as a window in a wall. In some configurations, the radiation shielding has a transmittance of about 85% or great and exhibits a haze of less than about 5%.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation, and use may be made without departing from the principles and concepts set forth herein. Also, as used herein, the examples and embodiments, in all respects, are meant to be illustrative only and should not be construed to be limiting in any manner.

The invention claimed is:

1. A method for making a radiation shielding material, comprising:
   providing an organobismuth monomer compound, and
   polymerizing the organobismuth monomer compound by mixing a co-monomer and a cross-linking agent with the organobismuth monomer compound to create a radiation shielding material containing about 30 to about 40 wt % bismuth.

2. The method of claim 1, wherein the organobismuth monomer compound is provided by combining a bismuth-containing salicylate, or derivative thereof, with a carboxylic acid monomer or an acid chloride monomer.

3. The method of claim 1, wherein an initiator is used during the polymerization.

4. The method of claim 3, wherein the initiator comprises AIBN, isonitriles, hydroperoxides, carbamates, peroxyacids, peroxyesters, or combinations thereof.

5. The method of claim 1, wherein the cross-linking agent comprises poly(ethylene glycol)dimethacrylate, tetra(ethylene glycol)dimethacrylate, divinyl benzene, or combinations thereof.

6. The method of claim 1, wherein the radiation shielding material is optically transparent.

7. The method of claim 1, wherein the co-monomer is capable of radical polymerization with the organobismuth monomer compound.

8. The method of claim 7, wherein the co-monomer is styrene.

9. The method of claim 1, wherein the organobismuth monomer compound is bismuth subsalicylate methacrylate monomer.

10. The method of claim 2, wherein the bismuth subsalicylate or its derivative and the carboxylic acid monomer or acid chloride monomer are combined under a vacuum.

11. The method of claim 1, wherein the radiation shielding material contains about 30 wt % bismuth.

12. The method of claim 1, wherein the radiation shield material has a transmittance of about 85% or greater and exhibits a haze of less than about 5%.

13. A method for making an optically transparent, radiation shielding material, comprising:
providing an organobismuth monomer compound, and
polymerizing the organobismuth monomer compound by mixing a co-monomer and a cross-linking agent with the organobismuth monomer compound to create a radiation shielding material containing about 30 to about 40 wt % bismuth with a transmittance of about 85% or greater and exhibiting a haze of less than about 5%.

14. The method of claim 13, wherein the radiation shielding material contains about 30 wt % bismuth.

15. The method of claim 13, wherein the organobismuth monomer compound is provided by combining a bismuth-containing salicylate, or derivative thereof, with a carboxylic acid monomer or an acid chloride monomer.

16. The method of claim 13, wherein an initiator is used during the polymerization.

17. The method of claim 16, wherein the initiator comprises AIBN, isonitriles, hydroperoxides, carbamates, peroxyacids, peroxyesters, or combinations thereof.

18. The method of claim 13, wherein the cross-linking agent comprises poly(ethylene glycol)dimethacrylate, tetra(ethylene glycol)dimethacrylate, divinyl benzene, or combinations thereof.

* * * * *